United States Patent [19]

Drews et al.

[11] 4,437,339

[45] Mar. 20, 1984

[54] LINEARIZING AND CONTROL CIRCUIT FOR AIR FLOW RATE METER

[75] Inventors: Ulrich Drews, Vaihingen; Peter Rapps, Karlsruhe; Peter Werner, Wiernsheim, all of Fed. Rep. of Germany

[73] Assignee: Robert Bosch GmbH, Stuttgart, Fed. Rep. of Germany

[21] Appl. No.: 300,090

[22] Filed: Sep. 8, 1981

[30] Foreign Application Priority Data

Oct. 11, 1980 [DE] Fed. Rep. of Germany ....... 3038498

[51] Int. Cl.[3] .......................................... G01M 15/00

[52] U.S. Cl. .......................................... 73/118; 73/204

[58] Field of Search ............. 73/118, 204, 765, 861.48

[56] References Cited

U.S. PATENT DOCUMENTS 4,070,908 1/1978 Newell ............................ 73/204 X 4,276,773 7/1981 Kawai et al. .......................... 73/204

*Primary Examiner*—Jerry W. Myracle

*Attorney, Agent, or Firm*—Edwin E. Greigg

[57] ABSTRACT

An electrically controlled fuel metering system having an air flow rate meter device in the air intake tube and a subsequent linearizing circuit layout is proposed. The linearizing circuit layout functions in accordance with the point-slope method and is embodied as a voltage-to-current converter. A first exemplary embodiment of the linearizing circuit layout has transistors coupled with one another respectively at the base and collector sides, the emitters of which are connected with different potentials and are triggered on the base side. In a second exemplary embodiment, individual transistors or transistors which are combined into groups receive their trigger signal via separate amplifiers, while the collectors in turn are carried to a common output point and the emitters likewise have different signal levels. Because of its relatively simple design, the proposed embodiments are particularly well suited to the purposes of integration.

5 Claims, 4 Drawing Figures

LINEARIZING AND CONTROL CIRCUIT FOR AIR FLOW RATE METER

BACKGROUND OF THE INVENTION

A fuel metering system, to function precisely, requires that the quantity of air aspirated be known, so as to be able to furnish a stoichiometric fuel/air mixture accordingly. Known fuel metering systems use a hot-wire air flow rate meter, operating on the constant-temperature principle. The output variable of a measuring device of this kind does not, however, have a linear relationship with the quantity of aspirated air. For the sake of further signal processing, it proves to be efficacious for such (non-linear) measuring devices to be followed by correction networks or linearizing elements. Linearizing circuit networks or layouts are already known in principle in the form of squaring circuits, for instance, or known in general as exponential circuits and exponential wave shaping circuits or networks. It is true that these known linearizing circuit networks or layouts are capable of producing satisfactory results; however, since there is only a limited degree of freedom with such circuits, compromises are necessary in terms of the precise conversion of the hot-wire air flow rate signal into a signal which is proportional to the quantity of air aspirated per unit of time.

OBJECT AND SUMMARY OF THE INVENTION

An electronically controlled fuel metering system according to the invention, having an air flow rate meter device in the air intake tube and a subsequently disposed linearizing circuit layout has the advantage over the prior art that the linearizing circuit may be adapted segmentally to the characteristic curve of the hot-wire air flow rate meter. The measurement results are good, and the device is simple, cost-favorable, and reliable in structure. It is furthermore distinguished by very good temperature stability.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
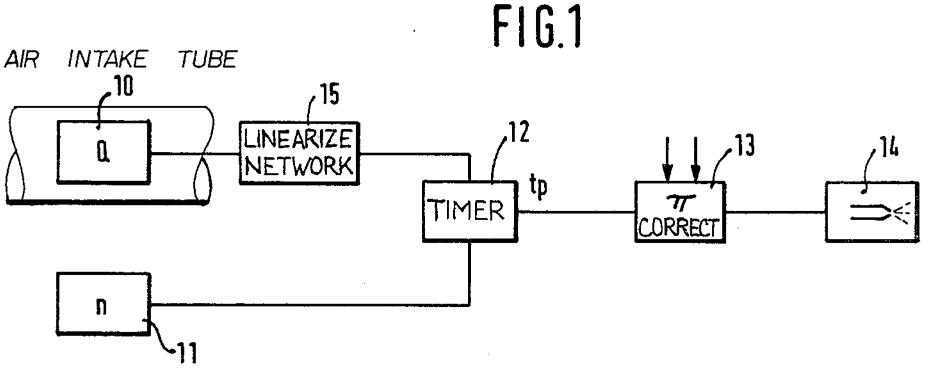
FIG. 1 is a schematic diagram showing an electronically controlled fuel injection system in an internal combustion engine which has externally supplied ignition.

FIG. 1 is a fundamental illustration of a fuel injection system in an internal combustion engine with externally supplied ignition. In principle, however, the invention may be put to use without respect to the type of fuel metering or the type of engine, whether gasoline or Diesel. The invention assures that the quantity or flow rate of air aspirated by the engine is capable of being further processing in the best possible manner in order to produce a signal.

Shown in FIG. 1 are an air flow rate meter 10, a hot wire by way of example, and an rpm meter 11. The output variables of the two measuring devices 10 and 11 are delivered to a timing element 12, which on its output side, via a correction circuit 13 and possible further circuits, is finally connected with injection valves 14. A linearizing circuit network or layout 15 is located between the air flow rate meter 10 and the timing element 12.

The layout shown in FIG. 1 is known in principle. The timing element 12 forms basic injection signals of respective duration tp on the basis of an air flow rate signal and of an rpm signal. In the following correction circuit 13, this basic injection signal is corrected, in accordance with temperature and acceleration, for instance, and finally carried to the electromagnetic injection valves 14.

In an analog form of embodiment, the timing element 12 includes a capacitor (not shown); over the course of a predetermined crankshaft angle detected with the rpm meter 11, this capacitor is charged or discharged with a current which depends on the output signal of the air flow rate meter 10. In accordance with the invention, this current controls the linearizing circuit layout 15.

Figure 2:
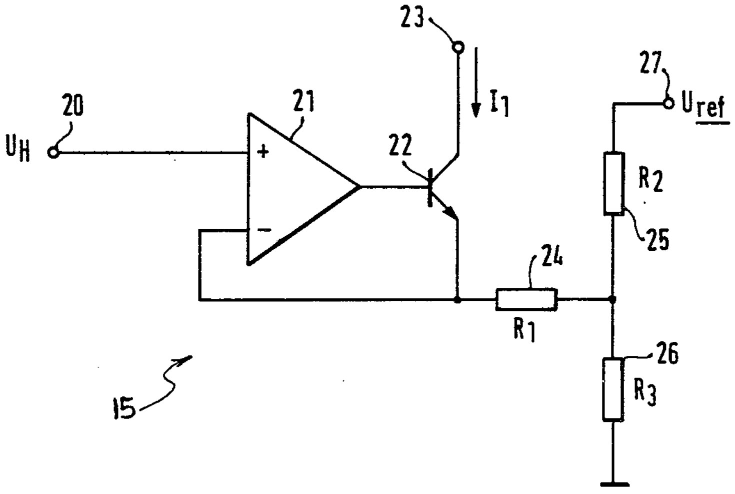
FIG. 2 shows one example of an individual element in the linearizing circuit layout.

The fundamental principle of one element of the linearizing circuit layout according to the invention is shown in FIG. 2. An input terminal 20 is followed by an amplifier 21. The output of this amplifier 21 is carried to the base of a transistor 22, whose collector is coupled directly with an output terminal 23 and whose emitter is connected with both the inverting input of the amplifier 21 and, via a resistor 24, the junction point of a voltage divider comprising two resistors 25 and 26. A reference voltage $U_{ref}$ is applied to one input 27 of the voltage divider.

If the resistors 24–26 are labeled R1–R3, the following relationship is obtained between the input voltage at terminal 20 and the output current at terminal 23, when there is an extremely high amplification of current on the part of the transistor 22 and a high input resistance on the part of amplifier 21:

$$I = \frac{UH(1/R3 + 1/R2) - Uref/R2}{R1(1/R1 + 1/R2 + 1/R3)}$$

In terms of the voltage-to-current conversion of the subject of FIG. 1, what is important is the dimensioning of the voltage divider having the resistors 25 and 26. It is the object of the invention to maintain the fundamental arrangement shown in FIG. 2, while realizing a polygonal or network effect in voltage-to-current conversion with different voltage dividers. A corresponding example is shown in FIG. 3.

Figure 3:
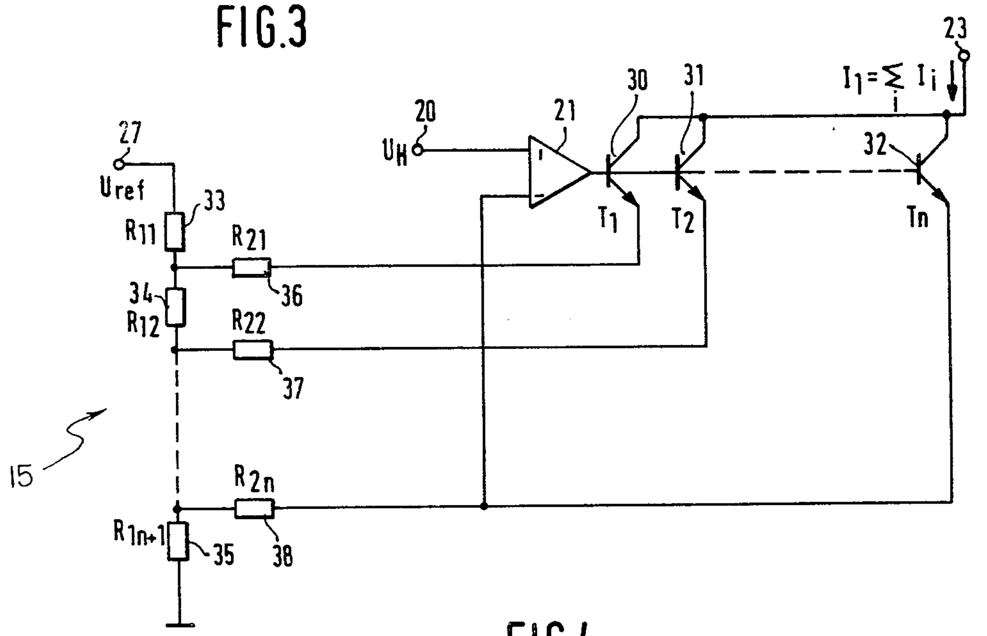
FIG. 3 shows the fundamental disposition of a multiple-element linearizing circuit layout.

In FIG. 3, a linearizing circuit layout is shown which is embodied as a voltage-to-current converter and has n stages of a point-slope selection network. Connection points and structural components which are identical to those shown in FIG. 2 are identified by identical reference numerals as well. While in the subject of FIG. 2 a single transistor 22 was disposed on the output side of the amplifier 21, the subject of FIG. 3 has a series of transistors 30, 31 and 32 whose number n is not necessarily limited. The broken connecting line between the transistor bases is intended to indicate a network of a multiplicity of identical structural components. A multiple-element voltage divider is indicated by reference numerals 33–35. There is one resistor of a network of resistors 36–38 each disposed between the respective connection points of the voltage divider 33–35 and the emitters of the individual transistors 30–32. In addition, the inverting input of the operational amplifier 21 is coupled with the emitter of the remotest transistor 32.

Depending upon the voltage $U_H$ at terminal 20 and thus upon the output potential of the amplifier 21, individual selected stages of transistors 30–32 are blocked, or they act as a source of constant current. The output current at the output terminal 23 is the product of the sum of the respective individual currents, which are determined in turn by the design of the multiple-element voltage divider 33–35.

In the subject of FIG. 3, the illustrated linearizing circuit includes a point-slope selection network having n stages, whose basic values and slope values are determined by the circuitry of the voltage divider. In other words the circuit comprises a point-slope values selection network in which the values are determined by selecting different voltage dividers by the input voltage for voltage-to-current conversion.

Figure 4:
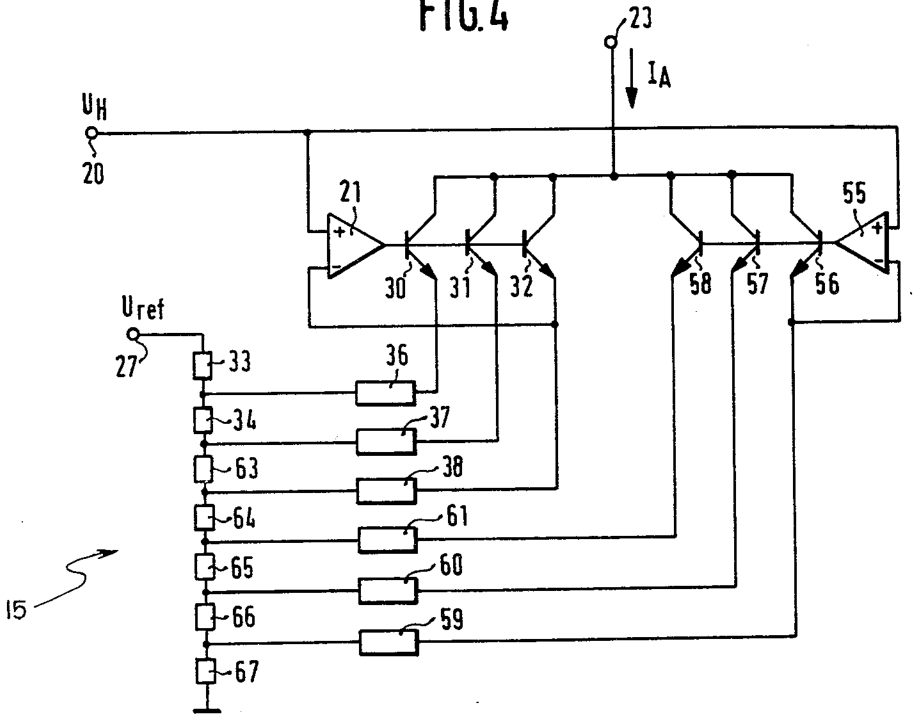
FIG. 4 is a fundamental illustration of a linearizing circuit layout which has been expanded in comparison with the example shown in FIG. 3.

In order to reduce the influence of the differences occuring with temperature-caused drifting in the individual base-emitter voltages, it may be advantageous to expand the circuit elements forming the polygonal course or network array; this is done by dividing up the output transistors into several groups and assigning one operational amplifier to each group. One example of such an expansion is shown in FIG. 4. As shown in the drawing, the fundamental layout of FIG. 3 is doubled in this realization. The structure in detail is as follows: Besides the operational amplifier 21 with the three transistors 30, 31 and 32, there is an identical second layout having a differential amplifier 55 and three transistors 56, 57 and 58. The bases of these individual transistors 56–58 are combined and are connected to the output of the differential amplifier 55. The collectors of the individual transistors are also connected directly to the output terminal 23. On the emitter side, these transistors are linked via resistors 59, 60 and 61 with the complete voltage divider comprising the resistors 33, 34, 63–67.

With the layout shown in FIG. 4, it is possible to realize a six-part polygonal course or network array. The three straight-line segments on the bottom are determined as the transistors 56, 57 and 58 become conductive in sequence, as the input voltage increases, while the three upper straight-line segments are determined correspondingly as the transistors 30, 31 and 32 become conductive.

The advantage of subdividing the current-source transistors into several groups, each having one operational amplifier, is that the collector currents of the transistors of one group differ less from one another, and thus the differences of the temperature coefficients of the base-emitter voltages are also smaller.

In the above-described examples of linearizing circuit layouts, what is important is the fact that their structure is relatively simple, while good temperature compensation is attained, particularly with a view to the generally desirable integration of the circuit layout. Furthermore, assuming an injection system as the fuel metering system under discussion, it is possible to attain a directly utilizable signal whenever the system includes a capacitor as a timing element.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An electronically controlled circuit for air flow measurement comprising:

an air intake tube an air flow rate meter device in the air intake tube and producing an output, and a linearizing circuit layout responsive to the output of the device, the linearizing circuit layout functioning to produce an output in accordance with different voltage dividers determining point-slope values selected by the output of the device for voltage-to-current conversion, whereby a total current is formed from the sum of individual currents dependent on the respective voltage dividers.

2. A circuit for air flow measurement as defined by claim 1, characterized in that the linearizing circuit layout includes at least two stages of transistors, the collectors of which are carried to a common connection point, the bases are exposed to the same signal and the emitters are connected to different potentials.

3. A circuit for air flow measurement as defined by claim 1, characterized in that the linearizing circuit layout includes at least two stages of transistors, the collectors of which are carried to a common connection point, the bases are triggerable via separate amplifiers and the emitters are capable of being exposed to different potentials.

4. A circuit for air flow measurement as defined by claim 2 or 3, characterized in that the different emitter potentials are derivable from a multiple-stage voltage divider means.

5. A circuit for air flow measurement as defined in claim 3, characterized in that the emitter potentials are formed on the basis of a stabilized voltage potential.

* * * * *